United States Patent [19]
Klausing

[11] Patent Number: 5,381,152
[45] Date of Patent: Jan. 10, 1995

[54] UNFOCUSSED SIGNAL PROCESSING APPARATUS FOR A SYNTHETIC APERTURE RADAR HAVING A ROTATING ANTENNA

[75] Inventor: Helmut Klausing, Bad Aibling, Germany

[73] Assignee: Deutsche Aerospace AG, Germany

[21] Appl. No.: 131,736

[22] Filed: Oct. 5, 1993

[30] Foreign Application Priority Data

Oct. 5, 1992 [DE] Germany .................... 4233415

[51] Int. Cl.⁶ ............................................. G01S 13/90
[52] U.S. Cl. ........................................ 342/25; 342/189
[58] Field of Search ............... 342/25, 90, 145, 158, 342/189, 192, 197

[56] References Cited
U.S. PATENT DOCUMENTS

4,638,315 1/1987 Raven ................................. 342/5
4,737,788 4/1988 Kennedy .............................. 342/29
5,017,922 5/1991 Klausing et al. ..................... 342/25
5,093,649 3/1992 Johnson ............................. 342/157

Primary Examiner—John B. Sotomayor
Attorney, Agent, or Firm—Evenson, McKeown, Edwards & Lenahan

[57] ABSTRACT

In a rotating antenna synthetic aperture radar, a method and apparatus for unfocussed signal processing for the correlation of the received signals by means of the reference functions. In unfocussed signal processing, only the main portion of the receiving signal $S_E$ is used, in which the phase shift is smaller than or equal to 90° for the go-and return-path of the signal. A simplified window function is used as a reference function whose width also corresponds to the main portion of the received signal. Preferably, the in-phase and quadrature component ($I_r$, $Q_r$) of the window function r are selected to be identical.

16 Claims, 5 Drawing Sheets

UNFOCUSSED SIGNAL PROCESSING APPARATUS FOR A SYNTHETIC APERTURE RADAR HAVING A ROTATING ANTENNA

BACKGROUND AND SUMMARY OF THE INVENTION

The present invention relates to the field of synthetic aperture radar (SAR), and in particular to signal processing apparatus for a SAR system having a rotating antenna.

German Patent Document DE-PS 39 22 086 discloses a rotating antenna synthetic aperture radar system (ROSAR Device) in which at least one antenna for transmitting and receiving radar pulses is arranged on the end of a rotating arm (for example, of a helicopter rotor or of a turnstile above the rotor axis). The received signals are demodulated and stored intermediately, and are then correlated with reference functions which are each calculated and preset based on the illumination geometry of the radar device.

The parameters for calculation and presetting of the reference functions are the distance intervals to be measured, the transmission frequency, the length of the rotating arm; the angle of rotation range of the antenna from which the reflected signals are receive; the number of transmitted pulses as well as the height of the rotating antenna above the ground. The correlation result is appropriately displayed, for example, on a monitor.

A radar device of this type may be used in approximate real time, in on-line operation. It thus can be used, for example, not only in the field of cartography and in obstacle warning operations, but also for the purpose of target reconnaissance and tracking. The processor of this known ROSAR-device has several modules so that the multiple and complex computing tasks may be subdivided, thereby permitting the approximate real time and on-line operation.

In this known apparatus, the result for each distance interval is always obtained by correlation or the received signal with a single reference function that is valid for that distance interval.

German Patent Document DE-PS 39 22 086 sets forth an approach for simplifying these reference functions under certain conditions; specifically when the target distance is either significantly larger than the height (or altitude) of the antenna above the ground, and is also much larger (or at least significantly larger) than the length of the rotor arm carrying the antenna. In all other cases, a complete solution (that is, without simplification) of the correlation is calculated. Despite the simplification measures described in this prior art, therefore, there remain considerable computing expenditures which require an extreme coordination of the computing operations.

One object of the present invention therefore, is to provide a method and apparatus for simplifying and reducing the computations necessary to perform the correlation referred to above, without impairing the broad applicability or the resolution of the radar device.

These and other objects and advantages are achieved according to the invention by performing the correlation for certain ranges using simplified reference functions, in a method which may, as it were, be referred to as "unfocussed signal processing." Basically, correlation of the received signals with the applicable reference function as performed in the prior art corresponds to a focussing, in that complete compensation of the cosinusoidal phase course is performed, and thus all received echoes along the synthetic aperture are summed in phase with the received signed. This operation supplies the best possible resolution, but has the above-mentioned disadvantage of high computing expenditures for correlation.

In unfocussed signal processing, only the main portion of the received signal is taken into account when the phase shift is less than $\pi/2$ for the go-and-return path of the signal run, which corresponds to a phase error of $\pi/4$ for the one-way case, or to a path difference of $\lambda/8$. As long as this condition is met, no correction need be carried out according to the Fraunhofer region condition. Although lateral resolution will deteriorate due to integration along a smaller synthetic aperture length, such degradation is acceptable for certain conditions. The advantage consists of a simplification of the reference function and of the signal processing.

Other objects, advantages and novel features of the present invention will become apparent from the following detailed description of the invention when considered in conjunction with the accompanying drawings.

DETAILED DESCRIPTION OF THE DRAWINGS

As in the case of a SAR with a linearly transported antenna, a maximum phase error of 90° (that is, $\pi/2$ and $\lambda/4$ in the case of an angle of rotation of the antenna of $\alpha = \alpha_{max}$) is permitted for the go-and-return path in a ROSAR-device, corresponding to a value of $\pi/4$ and $\lambda/8$ for the single path. In unfocussed signal processing, correlation does not utilize the complete reference function $S_R(t)$, but only a window function:

$$S_r(t) = I_r(t) + j Q_r(t) \tag{1}$$

whose width corresponds to the main portion of the received signal $S_E(t)$ within the above-mentioned limits for the phase angle (90° for the go-and-return path). Within this width, addition of the received signal takes place without phase correction. The correlation of the received signal in this manner corresponds to addition of the received echo which exceeds the antenna length, in the case of the radar with a real aperture. Strong damping takes place outside this interval. The window width (that is, the integration time pertaining to the illumination or the permissible angle of rotation range for the unfocussed signal processing) must be adapted to the received signal for each distance interval, and has the same size and shape for both the in-phase component and the quadrature component. During the integration time $T_s = 2 \cdot t_{max}$, the following applies for these components $I_r(t)$ and $Q_r(t)$:

$$I_r(t) = Q_r(t) = r(t) \text{ with } -t_{max} \leq t \leq t_{max}. \tag{2}$$

The window function $r(t)$ may be scaled as the transmission function of the filter to the energy content one. By means of the scaling factor K, the following will then apply:

$$r(t) = \begin{cases} K & \text{For } -t_{max} \leq t \leq +t_{max} \\ 0 & \text{Otherwise.} \end{cases} \tag{3}$$

Figure 1A:
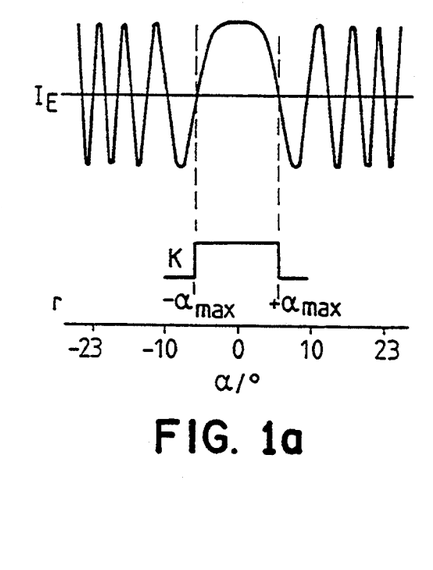
FIGS. 1A and 1B are grahic presentations of the in phase and quadrature components $I_E$ and $Q_E$ respectively of the received signal, and of the window function selected as the reference function with the proportion r for unfocussed signal processing according to the invention.
Figure 1B:
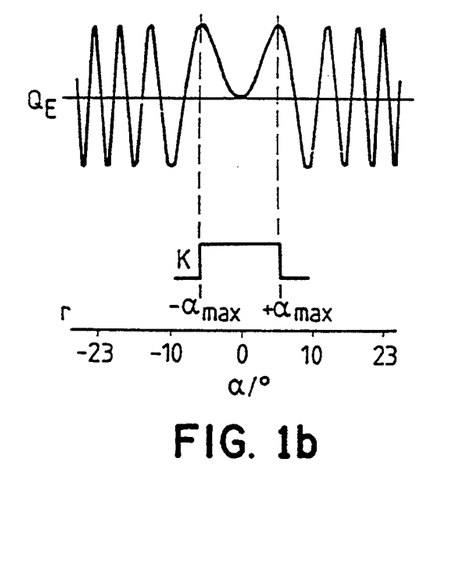

Scaling is not absolutely necessary, and may be omitted if only detection of targets (that is, the correlation result) is important. For the angle of rotation $\alpha$ pertaining to the window width (FIGS. 1A and 1b), making use of the definition $\alpha_{max} = \omega_0 \cdot t_{max}$, the following applies:

$$-\alpha_{max} \leq \alpha \leq +\alpha_{max}. \tag{4}$$

The maximum angle of rotation therefore determines the limit of the unfocussed signal processing, because at that point the value of the phase error approaches the permissible limiting value.

The window function $r(\alpha)$ may be expressed as the function of the angle of rotation $\alpha$ as follows:

$$r(\alpha) = rect\left(\frac{\Delta \alpha}{2 \cdot \alpha_{max}}\right) \tag{5}$$

where rect represents the rectangle function, and $$\Delta \alpha = \omega_0 \cdot \Delta t = \frac{\omega_0}{f_p}.$$

The inequality for the calculation of the maximum angle of rotation $\alpha_{max}$ for which unfocussed signal processing remains valid, is as follows:

$$R_n(t) \leq R_{SOn} + \frac{\lambda}{8} \tag{6}$$

wherein $R_n(t)$ is the target distance as a function of the time t; $R_{SOn}$ is the distance between the antenna and the center line of the illuminated distance interval in the target area; and $\lambda$, in turn, is the wavelength. When the illuminated strip is subdivided into N distance intervals, the index n indicates the number of the particular distance interval as a function of the radial resolution ($1 \leq n \leq N$). Where the slant distances $R_n(t)$ and the shortest distance to the target $R_{SOn}$ are determined by the following expressions:

$$R_n(t) = \sqrt{L^2 + R_{gn}^2 - 2 \cdot L \cdot R_{gn} \cdot \cos\alpha_n + H_o^2} \tag{6a}$$

and $$R_{SOn} = \sqrt{(R_{gn} - L)^2 + H_o^2} \tag{6b}$$

the following inequality is obtained:

$$\sqrt{L^2 + R_{gn}^2 - 2 \cdot L \cdot R_{gn} \cdot \cos\alpha_n + H_o^2} \leq \tag{7}$$

$$\sqrt{(R_{gn} - L)^2 + H_o^2} + \frac{\lambda}{8}.$$

By means of the formulas indicated in the above-mentioned prior art, German Patent Document DE-PS 39 22 086 taking into account the illumination geometry of the system, conversion of the above-mentioned inequality (6) or (7) into an equation results in an angle of rotation $\alpha_{nmax}$ for each distance interval n which is maximally permissible for the unfocussed signal processing, as follows:

$$\alpha_{nmax} = \text{Arccos}\left[1 - \left(\frac{\sqrt{(R_{gn} - L)^2 + H_o^2}}{L \cdot R_{gn}} \cdot \frac{\lambda}{8} + \frac{\lambda^2}{128 \cdot L \cdot R_{gn}}\right)\right]. \tag{8a}$$

For distances to the target which are large with respect to the rotor length L; that is, $R_{gn} >> L$, the following applies:

$$\alpha_{nmax} = \text{Arccos}\left[1 - \frac{\lambda}{8 \cdot L} \cdot \left(\sqrt{1 + \left(\frac{H_o}{R_{gn}}\right)^2}\right)\right]. \tag{8b}$$

For distances to the target which are large with respect to both the rotor length L and antenna height $H_O$ (that is, $R_{gn} >> L$ and $R_{gn} >> H_O$), the following is obtained:

$$\alpha_{nmax} = \text{Arccos}\left[1 - \frac{\lambda}{8 \cdot L}\right]. \tag{8c}$$

As can be seen from expression (8c), in the latter case, the maximal angle of rotation range $\alpha_{nmax}$ is independent of the distance geometry, and the window function therefore need not be adapted in the radial direction, thus permitting very rapid signal processing.

The synthetic aperture length $S_{nmax}$ pertaining to the maximum angle of rotation is obtained from equation (8) for the unfocussed case, specifically:

$$S_{nmax} = 2 \cdot \alpha_{nmax} \cdot L. \tag{9a}$$

The following applies to $R_{gn} >> L$:

$$S_{nmax} = 2 \cdot \alpha_{nmax} \cdot L. \tag{9b}$$

For $R_{gn} >> L$ and, at the same time, $R_{gn} >> H_O$, the following applies:

$$S_{nmax} = 2 \cdot \alpha_{nmax} \cdot L. \qquad (9c)$$

Figure 2:
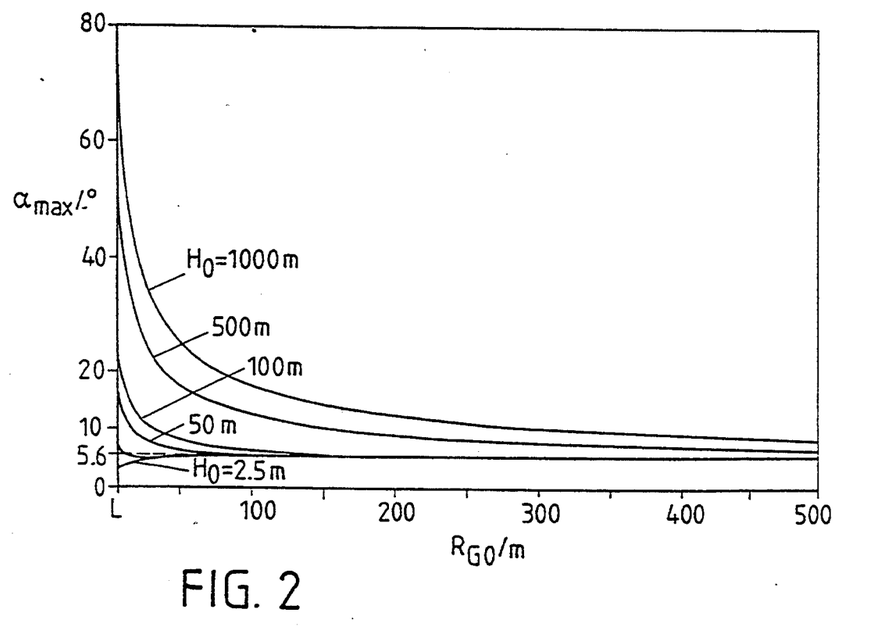
FIG. 2 is a graphic presentation of the maximum angle of rotation of the antenna as a function of distance Rg to a target object for various antenna heights Ho.

FIG. 2 is a graphic presentation of the maximum permissible angle of rotation $\alpha_{max}$ as a function of the distance $R_g$ to the target object for different heights $H_O$ of the antenna above the ground, assuming a wavelength of 0.23 m and a length L of the rotor arm of 6.00 m. It shows that, particularly at higher operating altitudes $H_O$, the angle of rotation range in which unfocussed signal processing is possible without any major loss of resolution is quite considerable. The interrupted line shows the maximum angle of rotation $\alpha_{max}$ according to equation (8c) with $\alpha_{max} = 5.6°$ which, in the case of this illumination geometry, will change only slightly starting at a distance of approximately 500 m.

Figure 3:
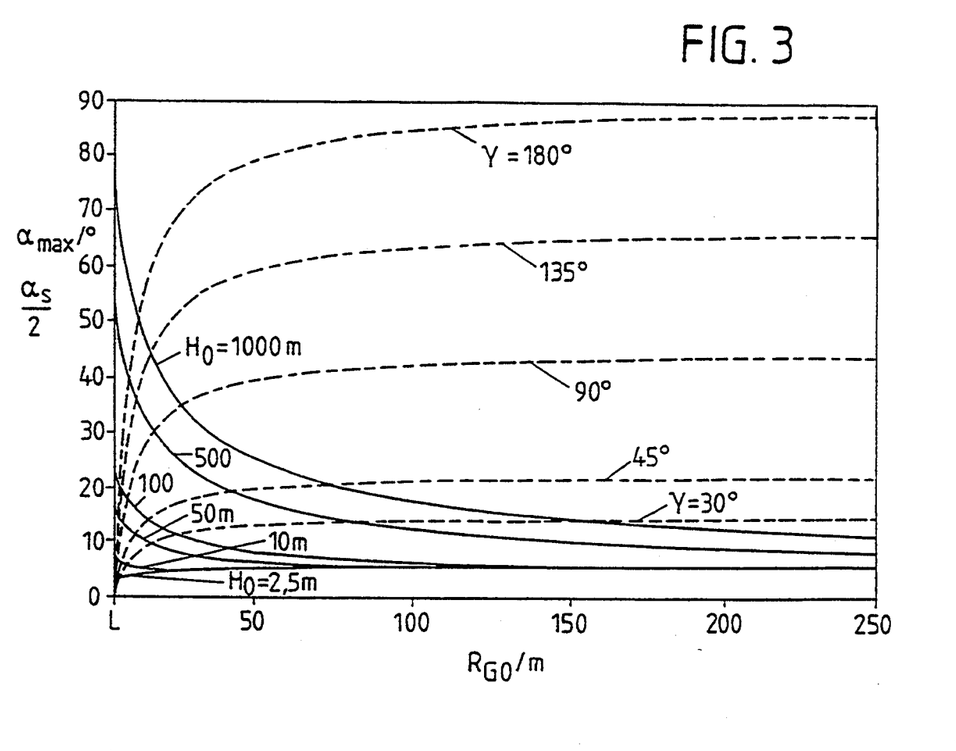
FIG. 3 shows the maximum angle of rotation according to FIG. 2, with a superimposed group of curves which represent the maximum angle of rotation of the received signal as a function of the apex angle of the antenna $\gamma$.

In addition to the maximum permissible angle of rotation $\alpha_{max}$ of the antenna, FIG. 3 also shows the maximum angle of rotation $\alpha_S/2$ of the received signal as a function of the apex angle $\gamma$ of the antenna and the target distance $R_g$, as a group of interrupted curves. In the close range, the angle $\alpha_{max}$, which is a function of the operating height $H_O$, is larger than the maximal angle of rotation $\alpha_S/2$, which is a function of the apex angle $\gamma$. Thus, in this case the window length for the unfocussed signal processing is larger than the length of the received signal. However, in this range, radial resolution on the ground is very poor, which is why the area that is actually of interest for unfocussed signal processing will exist when the maximal angle of rotation $\alpha_S/2$ becomes larger than the angle $\alpha_{max}$. In particular, unfocussed signal processing may be used at high frequencies, for example, above 35 GHz, (in the range of dwarf waves), for which smaller antenna dimensions are permissible. Thus, antennas of this type may be arranged on a helicopter, for example, on a small separate turnstile above the rotor axis, with a rotor length of approximately 1 m.

For the given approximations of the maximum angle of rotation $\alpha_{nmax}$ where $R_{gn} >> L$, and also where both $R_{gn} >> L$ and $R_{gn} >> H_O$, the lateral resolution $\Delta x$ may be estimated. For this purpose, the circular-arc-shaped synthetic aperture length S is replaced by the corresponding chord, and the antenna path within this small angle of rotation range is considered to be linear. With $S_{nmax} = 2 \cdot \alpha_{nmax} L$, the lateral resolution $\Delta x$ may be expressed as a function of the respective distance interval with the index n, as follows:

$$\Delta x_n = \frac{\lambda}{2 \cdot S_{nmax}} \cdot R_{gn} = \frac{\lambda}{4 \cdot \alpha_{nmax} \cdot L} \cdot R_{gn}. \qquad (10a)$$

When $R_{gn} >> L$, expression (10a) may be simplified as follows:

$$\Delta x_n = \frac{\lambda}{4\alpha_{nmax}} \cdot R_{gn} \qquad (10b)$$

And when $R_{gn} >> L$ and $R_{gn} >> H_O$:

$$\Delta x_n = \frac{\lambda}{4\alpha_{nmax}} \cdot R_{gn} \qquad (10c)$$

Because the maximum synthetic aperture length is limited to the semicircle of the rotor blade plane and does not (as in the case of the linear antenna movement) increase with increasing distance to the object, the maximum permissible angle of rotation for unfocussed signal processing starting at approximately 500 m reaches a limit value, and changes only slightly thereafter. Thus, the window length remains constant for increasing distances, which yields the important advantage that signal processing is accelerated considerably. For distances of less than 500 m, the angle of rotation is a function of the depression angle (that is, the ratio of height of the antenna above the ground to horizontal distance). The greater the height (that is, the more steeply the antenna is directed to the ground), the larger the depression angle. As a result the maximum permissible angle of rotation range also increases as the depression angle increases; that is, when the transmission path is almost vertical, its projection on the ground is small, and the phase deviation is proportional to this projection. Taking into account the marginal conditions illustrated in FIG. 3, unfocussed signal processing in the close range is also possible, if the desired radial resolution on the ground is sufficient.

Figure 4:
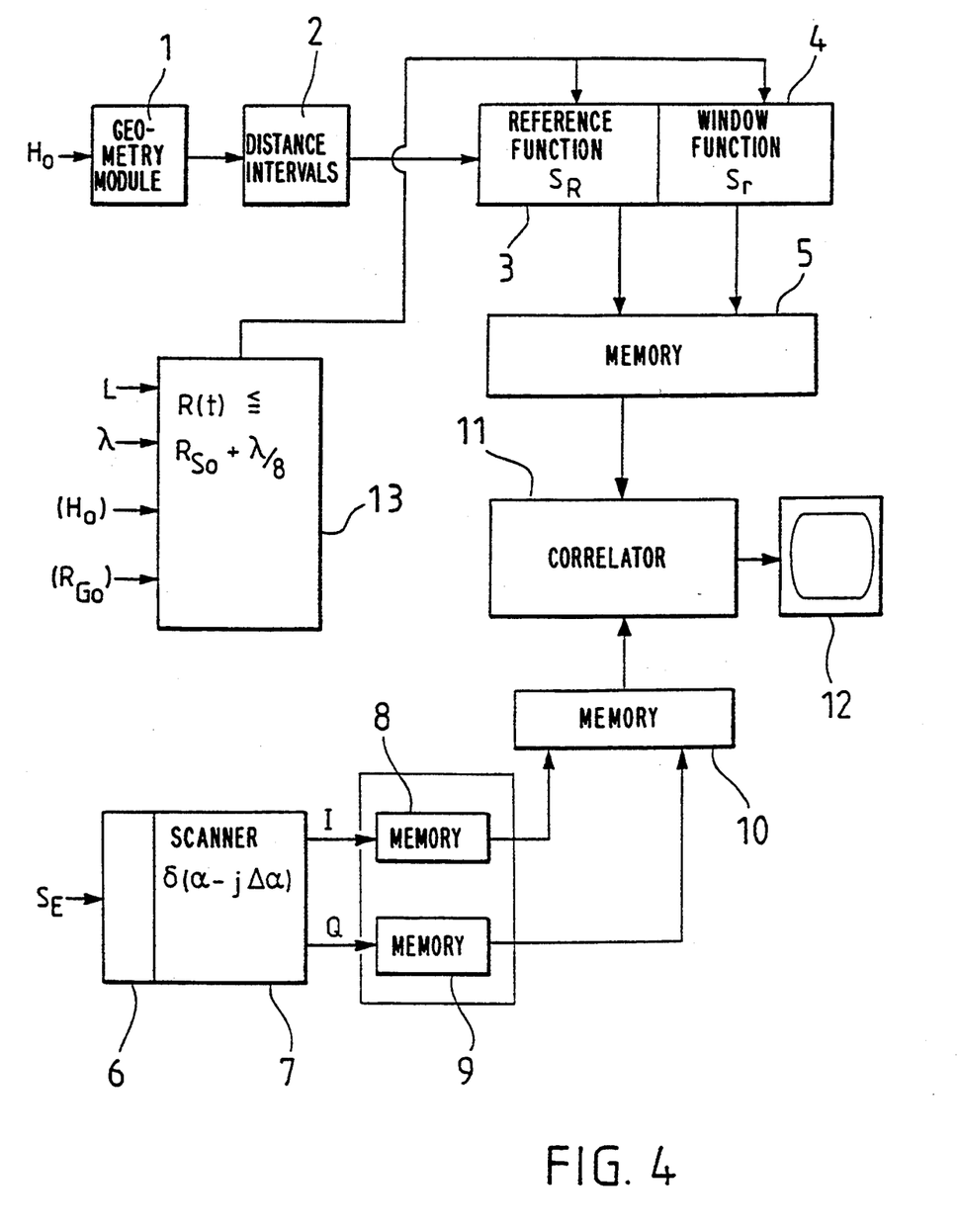
FIG. 4 is a conceptual block diagram of a radar device according to the invention, with unfocussed signal processing.

FIG. 4 is a conceptual block diagram for the processor of a ROSAR device, according to the invention. The processor has two channels, one being used to generate the reference functions, and the other to processing received signals. In the first channel, a geometry module 1 receives information concerning the height $H_o$ of the antenna above the ground and additional parameters, particularly the depression angle, the angle of inclination and the length of the rotor arm, and calculates the parameters required for the reference functions. These parameters are then fed to another circuit 2 in which the overall distance range of the ROSAR device is subdivided into a plurality of distance intervals. Based on this subdivision, the reference functions will then be calculated in an additional module 3, in which (as in German Patent Document DE-PS 39 22 086 referred to previously), different ranges are selected for the reference functions, according to whether the target distance is: i) much higher than the height of the antenna above the ground, or ii) smaller than or equal to it, but much larger than the length of the rotor arm. In addition, in another module 4, the above-mentioned simplified reference or window functions are calculated. A memory 5 is provided to store the reference or window functions calculated in modules 3 and 4.

In the second channel, the received signals $S_E$ are fed to a quadrature modulator 6, where they are scanned in a scanning circuit and resolved into their in-phase and quadrature components $I_E$ and $Q_E$. These components are then stored temporarily in intermediate memories 8 and 9, and by way of a memory 10 are fed synchronously with the corresponding reference or window functions, to a correlator 11. The correlation result is displayed, for example, on a monitor 12, and/or is analyzed further.

A comparator processor module 13 calculates the above inequality (7) and equation (8) to determine the maximum angle of rotation in which unfocussed signal processing is possible. The parameters necessary to perform this calculation, which were determined from the geometry module 1 and the circuit 2, are fed to the comparator processor module 13. If the calculation takes the form of an approximation as described above, however, the parameters corresponding to equation (8c) can be limited to the two parameters L and $\lambda$.

The comparator processor module 13 controls processing in the two modules 3 and 4 with respect to the choice between use of the complete reference function $S_R(t)$ and the window functions $S_r(t)$, and hence determines when unfocussed signal processing is performed. The reference function as well as the window function may of course each be simplified depending on the design of the individual areas.

Figure 5:
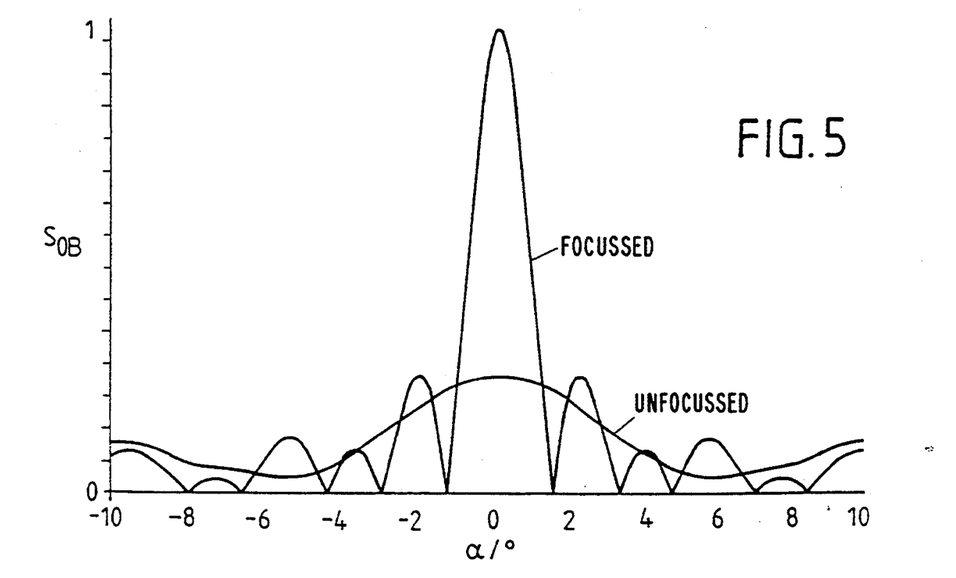
FIG. 5 is a comparison of the calculated results for focussed and unfocussed signal processing.

FIG. 5 is a graphic illustration of the results for focussed and unfocussed signal processing in which case unfavorable parameters were used; specifically, a wavelength of 0.23 m, a rotor blade length of 6 m, and an approximation value of the maximum angle of rotation according to equation (8c) of 5.6° as well as a lateral resolution of approximately 0.1 times the target distance. In this case, the target distance was again significantly larger than the rotor blade length and significantly higher than the height of the antenna above the ground. As is demonstrated by FIG. 5, despite these poor parameters, the result can already be clearly distinguished from the background, and the illuminated object can therefore be clearly verified.

Figure 6A:
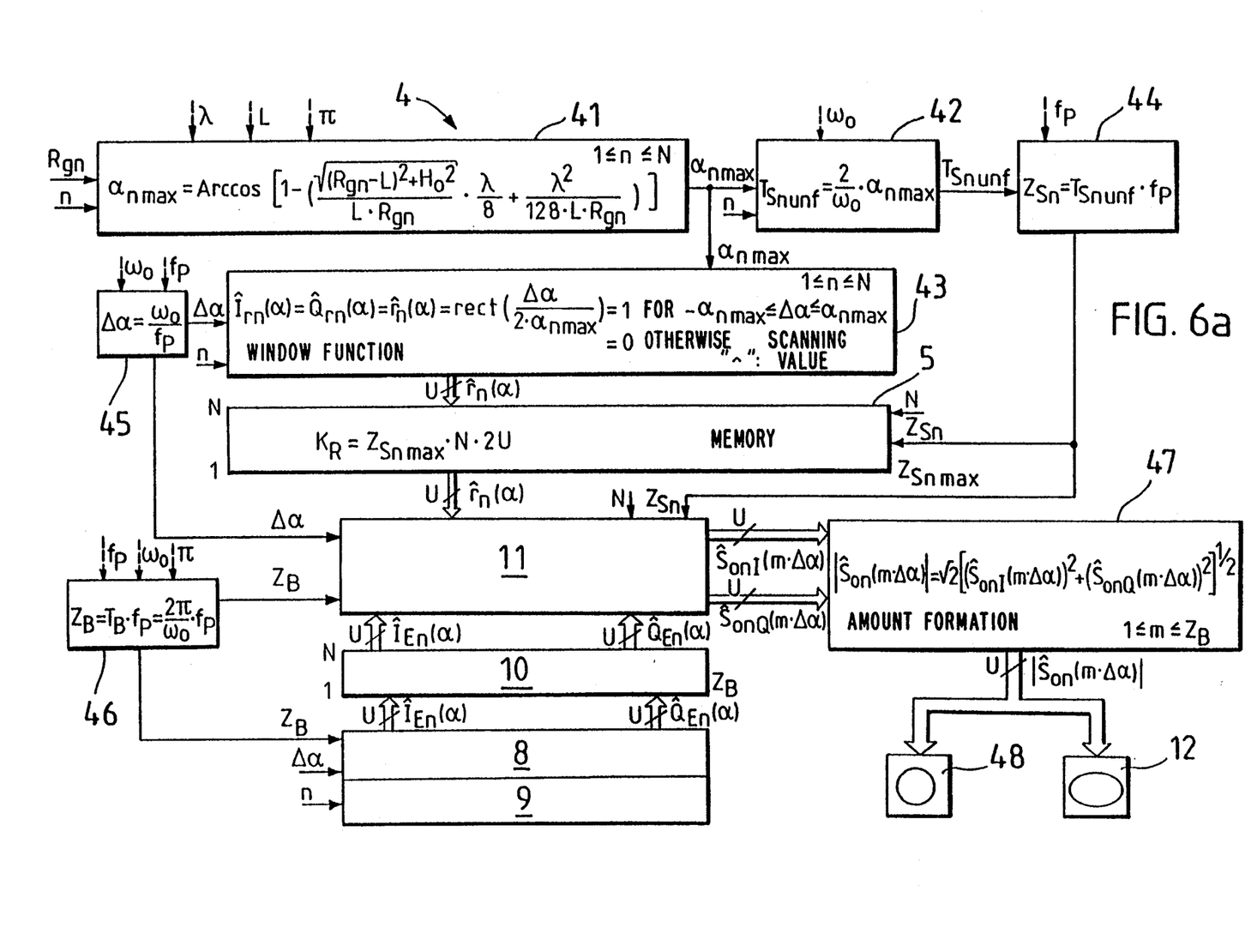
FIGS. 6a and 6b contain a more detailed block diagram of essential circuit modules for unfocussed signal processing.
Figure 6B:
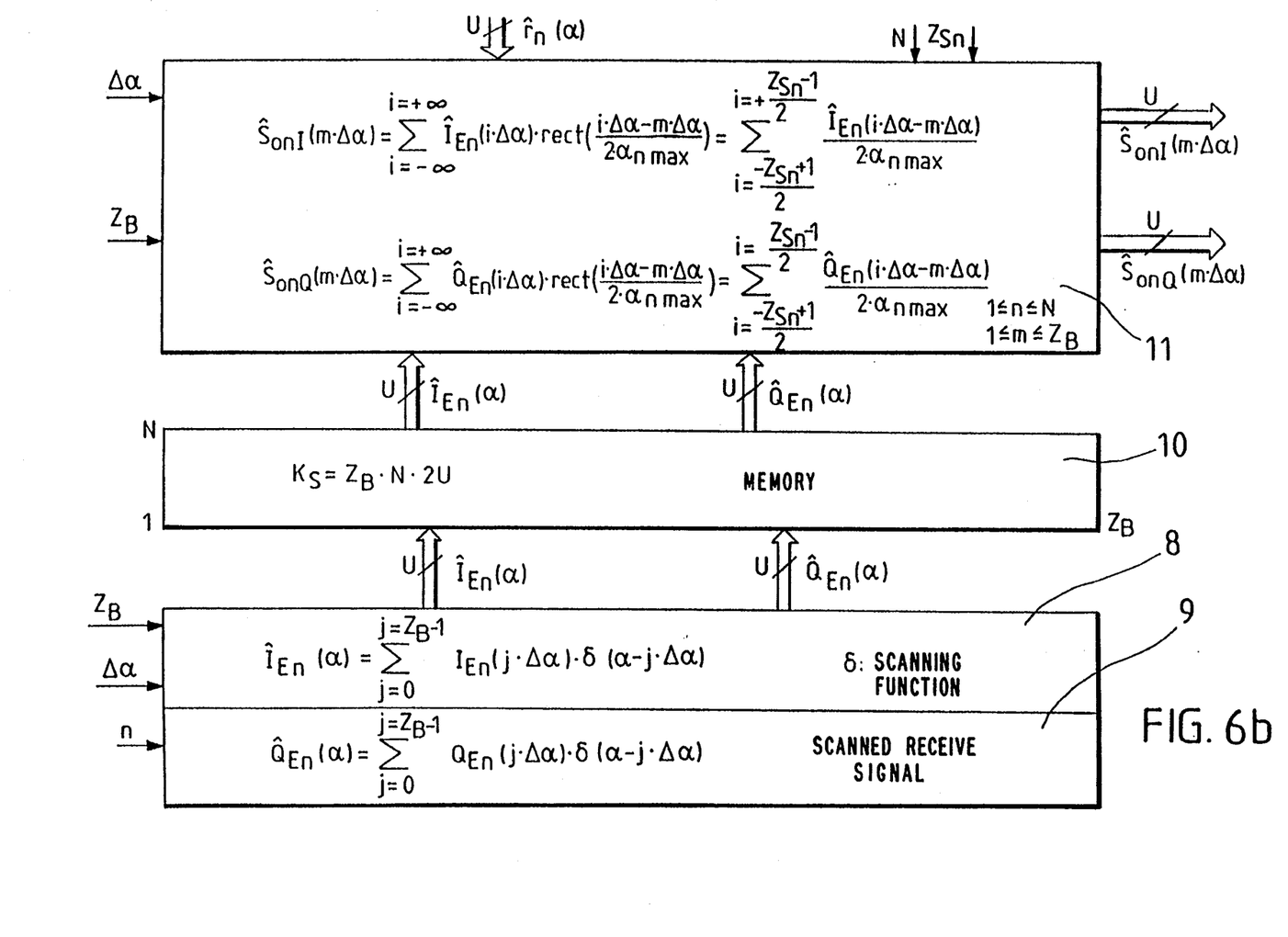

FIG. 6 shows a detailed block diagram for the correlation of the arriving signals with the window functions. The above-mentioned module 4, which generates the simplified reference or window functions, has an angle computing circuit 41 which calculates the maximum permissible angle of rotation $\alpha_{nmax}$ for unfocussed signal processing, as provided in equation (8a) above. Input signals for this circuit are:

$R_{gn}$: the distance from the fulcrum of the antenna to the center point of the respective distance interval;

n: the consecutive index designation for the respective individual distance intervals;

$\lambda$: the wavelength of the transmitted signal;

L: the length of the rotor blade and of the rotating arm; and $\pi$: the ratio between the diameter and circumference of a circle.

The calculated value for the permissible angle of rotation (that is, the size of the angle window within which the unfocussed signal processing is permissible) is fed simultaneously to a window time calculating circuit 42 and to a window function calculating circuit 43. In the window time calculating circuit, the integration time $T_{Sunf}$ corresponding to the formula indicated in block 42 in FIG. 6 is calculated from the consecutive index n and the circle frequency $\omega_0$. In a supporting point calculating circuit 44, this integration time is multiplied with the pulse repetition frequency $f_p$ of the system, which determines the number of supporting points $Z_S$; that is, the number of transmitted pulses within the given window. The window of the whole angle of rotation is then subdivided corresponding to the number of supporting points so that respective correlations are formed at these locations. The initial value $Z_S$ from the supporting point calculating circuit 44 is fed to the memory 5 for the reference or window functions and to the correlator 11. For calculation of the window functions, the window function calculating circuit 43 is connected with an increment presetting circuit 45 which furnishes, from the values for the circle frequency $\omega_0$ and the pulse repetition frequency $f_p$, the angle $\Delta\alpha$ (that is, the angular increment from one supporting point to the next). In addition, the consecutive index n is fed to the window function calculating circuit 43. Analogously to the above-mentioned equation (2), the in-phase and the quadrature components of the window function are given in the window function calculating circuit 43. (In FIG. 6, these functions depend on the angle $\alpha$ and not on the time t, but these two parameters are in a direct connection with the circle frequency $\omega_0$. The scanning values for the in-phase and quadrature components of the window functions for the individual distance intervals with the consecutive index n, which are marked by a caret " ", are always identical and are determined by the rectangle function rect $[\Delta\alpha(2\cdot\alpha_{max})]$ which is one for the values of $\Delta\alpha$ between $-\alpha_{max}$ and $+\alpha_{max}$, and otherwise is zero (see Expression 3 above). This applies to all distance intervals, that is for the consecutive index n between 1 and N. Expression (3), it should be noted, relates to time as a function parameter. The window function $r_n(\alpha)$ is fed to the memory 5 whose capacity $K_R$ must correspond to at least the product of the maximal number of supporting points $Z_S$, the total number N of the distance intervals and the word length U (that is, the number of bits of the window function).

On the receiving side, a pulse counting circuit 46 is provided in which the number $Z_B$ of the transmitted pulse are calculated at 360°. This number is composed of the product of the total integration time $T_B$ for 360° and the pulse repetition frequency $f_p$. On the one hand, the number $Z_B$ is fed to the correlator 11 and, on the other hand, to the intermediate memories 8 and 9 for the in-phase and quadrature component of the received signal. The components $I_E$ and $Q_E$ are again illustrated as analog-digitally converted scanning values with a caret " " as a function of the angle of rotation for the individual distance intervals with the consecutive index n. The scanned values of the in-phase and quadrature component are fed to a memory 10, which has a storage capacity corresponding to at least the product of the maximum number $Z_B$ of the transmitted pulses at 360°, the number of distance intervals and twice the word length (that is, twice the number of bits of the respective component). The window functions and received-signal components for the same consecutive index n are now each fed synchronously to the correlator 11 and are correlated according to the formulas indicated in the correlator block 11. The results $S_O$ for the individual distance intervals with the consecutive index n for the in-phase and quadrature proportion I and Q (which are again characterized by a caret), are output from the correlator 11 and are multiplied by the angle increment $\Delta\alpha$ and by another consecutive index m (an integer between 1 and the total number $Z_B$ of the transmitted pulses). They are then fed to an mount forming circuit 47 (FIG. 6a) in which the scanned result function $S_{on}(m\cdot\Delta\alpha)$ is formed. This amount, that is, the real correlation result, is then fed to the monitor 12 or to an additional analysis unit 48.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A radar device comprising:
   at least one transmitter;
   at least one receiver;
   at least one antenna for transmitting and receiving radar pulses, said antenna being arranged on the end of a rotating arm;

a device for demodulating and intermediately storing received signals;

a first processor circuit for forming and storing reference functions based on a predetermined array of system parameters;

a correlator for correlating received signals with the reference functions; and an output device for a correlation result;

wherein said correlator comprises means, operative when phase shift for a go-and-return path of emitted and received signals is less than or equal to 90°, for performing said correlation using only a main portion of the received signal and a simplified window function in place of the reference function, said window function having a width corresponding to width of the main portion of the received signal.

2. Radar device according to claim 1, wherein said predetermined array of system parameters comprises at least one of:

illumination geometry of the radar device, distance intervals to be measured, angle of rotation ranges, transmitted pulses as well as the height of the rotating antenna above the ground.

3. Radar device according to claim 1, wherein said output device comprises at least one of:

a display device and an analysis unit.

4. A radar device according to claim 1, wherein said window function has an in-phase and quadrature component which are identical.

5. A radar device according to claim 4, wherein the in-phase and quadrature component ($I_r$, $Q_r$) each comprise a jump function of a scaled value within limits defined by the main portion of the received signal and a value of zero outside these limits.

6. A radar device according to claim 1, wherein the correlation is performed by means of the window function within a maximum angle of rotation to which the inequality $$R_n(t) \leq R_{SOn} + \frac{\lambda}{8}$$

applies, where $R_n(t)$ is a target distance, $R_{SOn}$ is a distance between the antenna and a center line of a strip illuminated by the antenna, and $\lambda$ is a wavelength of the transmitted signal, and where the illuminated strip is subdivided into N distance intervals, the index n being number of a particular distance interval as a function of radial resolution ($1 \leq n \leq N$).

7. A radar device according to claim 5, wherein the correlation is performed by means of the window function within a maximum angle of rotation to which the equation $$R_n(t) \leq R_{SOn} + \frac{\lambda}{8}$$

applies, where $R_n(t)$ is a target distance, $R_{SOn}$ is a distance between the antenna and a center line of a strip illuminated by the antenna, and $\lambda$ is a wavelength of the transmitted signal, and where the illuminated strip is subdivided into N distance intervals, the index n being number of a particular distance interval as a function of radial resolution ($1 \leq n \leq N$).

8. A radar device according to claim 6, wherein the maximal angle of rotation for an individual distance interval n is calculated at:

$$\alpha_{nmax} = \text{Arccos}\left[1 - \left(\frac{\sqrt{(R_{gn} - L)^2 + H_o^2}}{L \cdot R_{gn}} \cdot \frac{\lambda}{8} + \frac{\lambda^2}{128 \cdot L \cdot R_{gn}}\right)\right].$$

wherein $R_{gn}$ is distance from a fulcrum of the antenna to a center point of a particular distance interval n, L is a length of a rotating arm which carries the antenna, $H_O$ is a height of the antenna above the ground, and $\lambda$ is the wavelength of the transmitted signal.

9. A radar device according to claim 1, further comprising a calculating and presetting circuit for subdividing an area in which correlation is performed with the simplified window function, and wherein the received signal is scanned and correlated with a pertaining window function at supporting points determined by said subdivision.

10. A radar according to claim 5, further comprising a calculating and presetting circuit for subdividing an area in which correlation is performed with the simplified window function, and wherein the received signal is scanned and correlated with a pertaining window function at supporting points determined by said subdivision.

11. A radar device according to claim 9, wherein the calculating circuit comprises a supporting-point calculating circuit and an increment presetting circuit in which a number and position of the supporting points are determined at which values for the window functions are formed, and the received signals are scanned.

12. A radar device according to claim 10, wherein the calculating circuit comprises a supporting-point calculating circuit and an increment presetting circuit in which a number and position of the supporting points are determined at which values for the window functions are formed, and the received signals are scanned.

13. A radar device according to claim 1, wherein $$r(t) = \begin{cases} K & \text{For } -t_{max} \leq t \leq +t_{max} \\ O & \text{Otherwise} \end{cases}$$

is used as the simplified window function, wherein $\pm t_{max}$ is a time assigned to the maximally permissible angle of rotation $\alpha_{max}$.

14. A radar device according to claim 5, wherein $$r(t) = \begin{cases} K & \text{For } -t_{max} \leq t \leq +t_{max} \\ O & \text{Otherwise} \end{cases}$$

is used as the simplified window function, wherein $\pm t_{max}$ is a time assigned to the maximally permissible angle of rotation $\alpha_{max}$.

15. A radar device according to claim 9, wherein $$r(t) = \begin{cases} K & \text{For } -t_{max} \leq t \leq +t_{max} \\ O & \text{Otherwise} \end{cases}$$

is used as the simplified window function, wherein $\pm t_{max}$ is a time assigned to the maximally permissible angle of rotation $\alpha_{max}$.

16. A radar device according to claim 10, wherein $$r(t) = \begin{cases} K & \text{For } -t_{max} \leq t \leq +t_{max} \\ O & \text{Otherwise} \end{cases}$$

is used as the simplified window function, wherein $\pm t_{max}$ is a time assigned to the maximally permissible angle of rotation $\alpha_{max}$.

* * * * *